(12) United States Patent
Choo (10) Patent No.: US 9,950,310 B2
(45) Date of Patent: Apr. 24, 2018

(54) PREPARATION METHOD OF GRANULAR OXIDE ADSORBENT, AND WATER TREATMENT METHOD USING SAME

(71) Applicant: KYUNGPOOK NATIONAL UNIVERSITY INDUSTRY-ACADEMIC COOPERATION FOUNDATION, Daegu (KR)

(72) Inventor: Kwang-Ho Choo, Daegu (KR)

(73) Assignee: Kyungpook National University Industry-Academic Cooperation Foundation, Daegu (KR)

( * ) Notice: Subject to any disclaimer, the term of this patent is extended or adjusted under 35 U.S.C. 154(b) by 123 days.

(21) Appl. No.: 14/369,335

(22) PCT Filed: Dec. 28, 2012

(86) PCT No.: PCT/KR2012/011705
§ 371 (c)(1),
(2) Date: Oct. 2, 2014

(87) PCT Pub. No.: WO2013/100691
PCT Pub. Date: Jul. 4, 2013

(65) Prior Publication Data
US 2015/0021267 A1    Jan. 22, 2015

(30) Foreign Application Priority Data

Dec. 28, 2011 (KR) ........................ 10-2011-0145211

(51) Int. Cl.
*B01D 15/04* (2006.01)
*B01J 20/30* (2006.01)
(Continued)

(52) U.S. Cl.
CPC ........ *B01J 20/3071* (2013.01); *B01D 61/145* (2013.01); *B01D 61/16* (2013.01);
(Continued)

(58) Field of Classification Search
CPC .................. B01J 20/3071; B01J 20/265; B01J 20/28026; B01J 20/08; B01J 20/30;
(Continued)

(56) References Cited

U.S. PATENT DOCUMENTS 3,892,862 A * 7/1975 Gitlitz ....................... C07F 7/22
514/493
3,951,778 A * 4/1976 Willard, Sr. ............. B01J 23/02
208/391
(Continued)

FOREIGN PATENT DOCUMENTS

| JP | 1995185540 | 7/1995 |
| JP | 2002263483 | 9/2002 |

(Continued)

*Primary Examiner* — Richard C Gurtowski
(74) *Attorney, Agent, or Firm* — McNees Wallace & Nurick LLC (57) ABSTRACT

The present invention relates to a preparation method of a granular oxide adsorbent for water treatment in which a metal oxide is bound to the surface of polymer particles, and more specially, to a preparation method of a granular oxide adsorbent, comprising the following steps: putting polymer particles in an acidic solution; adding polymer particles to a metal oxide aqueous solution and adjusting a pH; and washing and drying the obtained product. Accordingly, a granular oxide adsorbent prepared by the preparation method is provided and is utilized in water treatment and the like.

6 Claims, 5 Drawing Sheets

(51) Int. Cl.
    *B01J 20/06*    (2006.01)
    *C02F 1/28*     (2006.01)
    *B01J 20/08*    (2006.01)
    *B01J 20/28*    (2006.01)
    *B01J 20/26*    (2006.01)
    *C02F 1/44*     (2006.01)
    *C08F 8/42*     (2006.01)
    *B01D 61/14*    (2006.01)
    *B01D 61/16*    (2006.01)

(52) U.S. Cl.
    CPC ............... *B01J 20/06* (2013.01); *B01J 20/08* (2013.01); *B01J 20/265* (2013.01); *B01J 20/28026* (2013.01); *B01J 20/30* (2013.01); *C02F 1/288* (2013.01); *C02F 1/44* (2013.01); *C08F 8/42* (2013.01); *B01D 2311/04* (2013.01); *B01D 2311/2626* (2013.01); *C02F 1/444* (2013.01); *C02F 2303/16* (2013.01)

(58) Field of Classification Search
    CPC .. B01D 61/16; B01D 61/145; B01D 2311/04; B01D 2311/2626; C08F 8/42; C02F 1/44; C02F 1/288; C02F 2303/16; C02F 1/444
    See application file for complete search history.

(56) References Cited

U.S. PATENT DOCUMENTS 4,357,281 A * 11/1982 Hinkamp .............. C07C 309/00
                                                    507/255
6,113,792 A *  9/2000 Benjamin ............. B01D 61/04
                                                    210/636

FOREIGN PATENT DOCUMENTS

JP      2006297382      11/2006
KR      1020130049046    5/2013

* cited by examiner

PREPARATION METHOD OF GRANULAR OXIDE ADSORBENT, AND WATER TREATMENT METHOD USING SAME

TECHNICAL FIELD

The present disclosure relates to a method for preparing a granular oxide adsorbent and a water treatment method using the same, and more specially, to a method for preparing a granular oxide adsorbent for water treatment by binding a metal oxide to the surface of polymer particles, and to a water treatment method using the adsorbent prepared thereby.

BACKGROUND ART

Conventional water treatment processes include aggregation, precipitation, filtration and disinfection, and the main treatment targets are limited to suspended materials and pathogenic microorganisms inactivated by chlorine disinfection. However, the water quality of raw water is increasingly deteriorating due to industrialization, population growth and the like, and existing water treatment processes expose their limits as various contaminants that have not been considerably questioned or detected have now surfaced as new harmful substances with the development of medicine, chemistry and analysis instruments.

Particularly, the circumstances regarding small-scale water supply facilities are more serious, and the facilities themselves have deteriorated as well as being very inferior. In addition, water sources are rivers, shallow underground water, wells, or the like, and therefore the water quantity and water quantity changes are extremely variable, and the water is exposed to the possibility of contamination due to nearby domestic sewage, livestock wastewater, agricultural chemicals or the like.

Accordingly, the introduction of a new water treatment process to solve the problems of small-scale water treatment facilities is urgently needed, and the introduction of advanced water treatment processes such as a biological activated carbon processes or advanced oxidation processes using ozone have been tried so far. However, these processes are not suited for small-scale facilities, and are usually introduced to purification plants of a relatively large scale.

Developed countries such as the US and Japan are currently introducing a membrane separation process as a water treatment process in order to solve such problems. A membrane separation process is usually removing contaminants according to membrane pores and molecular weight cut-offs in water quality, therefore, almost all pathogenic microorganisms as well as turbidity and algae may be removed when proper membranes are selected depending on the water quality of the target water treated. *Cryptosporidium, giardia* or the like that are not inactivated by chlorine disinfection, which have recently been an issue in the US, Japan and the like, may be effectively removed just by microfiltration, and may be almost completely removed when ultrafiltration is used, and almost all viruses are also removed by ultrafiltration. In addition, a membrane separation process may readily form a hybrid system with other physicochemical treatment processes and thereby may relatively readily improve water quality by adding proper treatment processes for contaminants to treat, and may obtain the target water quality.

Meanwhile, microfiltration/ultrafiltration membranes normally used in water treatment currently may remove almost all of the turbidity, bacteria, insoluble iron and manganese, algae and the like, however, colors and precursors of disinfection byproducts (e.g., trihalomethane) remain in water, and these are pointed out as being a problem of water treatment processes using a membrane. Nitrate or heavy metals such as iron, manganese and the like in purified raw water are considered as problems particularly in small-scale purification plants, and these microcontaminants are difficult to remove by a single membrane process. Accordingly, membrane fouling may be controlled by changing physicochemical properties of several membrane fouling materials and particulates by chemical coagulation in order to control specific materials and membrane fouling, however, large amounts of chemical sludge are generated. Particulates may be controlled by sand filtration or fiber filtration, however, sand layer blockage and short circuit phenomena in operation and backwashing processes, and entanglement of fibers are pointed out as operation problems. Adsorbents, such as powdered active carbon and metal oxide may be used as pretreatment, however, recovery and regeneration of used adsorbents, and the like, are a big obstacle.

In view of the above, the inventors of the present invention have developed a method of granulating inorganic adsorbents, controlled membrane fouling and demonstrated improved water treatment efficiency using the granular oxide adsorbent as a pretreatment before membrane filtration, and thereby completing the present invention.

DISCLOSURE

Technical Problem

An objective of the present invention is to provide a method for preparing a granular oxide adsorbent for water treatment in which a metal oxide is bound.

Another objective of the present invention is to provide a granular oxide adsorbent prepared using the preparation method.

Still another objective of the present invention is to provide a water treatment method using the adsorbent.

Technical Solution

In view of the above, the present invention provides a method for preparing a granular oxide adsorbent comprising the steps of placing polymer particles in an acidic solution (Step 1); washing and drying the polymer particles (Step 2); adding the polymer particles to an aqueous oxide solution, adjusting a pH to pH 5 to pH 10 while agitating the solution (Step 3); and washing and drying the polymer particles (Step 4).

Step 1 is a step of treating the surface of polymer particles so that an oxide can be bound to the surface of the polymer particles, that is, a step of placing polymer particles in an acidic solution. As the acidic solution, one or more M types of solutions selected from the group consisting of hydrochloric acid, nitric acid and sulfuric acid may be used, and the pH of the solution is preferably adjusted to pH 1 to pH 3. The polymer particles may be added after the acidic solution is prepared in advance, or the polymer particles may be placed in ultrapure water and then the pH is adjusted by adding the acidic solution. The polymer surface is treated while the polymer particles are placed in the acidic solution, and placing the solution for 24 hours at room temperature is preferable.

The polymer particles are preferably polymer particles having a sulfonate group in order to bind a metal ion. As one example, sulfonated polystyrene may be used, however, the example is not limited thereto.

Step 2 is a step of washing the acid remaining in the polymer particles, and drying, so that the polymer particles that underwent Step 1 can be used in the following steps. Washing with ultrapure water is preferable, and complete drying in an oven and the like is preferable.

Step 3 is a step of forming an oxide on the surface of the polymer particles that underwent Step 2, and is a step of adding the polymer particles to an aqueous metal oxide solution, adjusting the pH to pH 5 to pH 10 while agitating the solution.

As the metal oxide, one or more types selected from the group consisting of iron oxide, aluminum oxide and titanium oxide may be used, however, the metal oxide is not limited thereto. Preferably, one or more types selected from the group consisting of ferrihydrite, magnetite, hematite and goethite may be used, however, the metal oxide is not limited thereto. The oxide is formed on the surface of the polymer particles by adjusting the pH after the polymer particles are added to she aqueous metal oxide solution. Herein, it is preferable that the pH be adjusted depending on the types of the oxides to be formed, and as one example, the pH is preferably adjusted to pH 7 for ferrihydrite, and the pH is preferably adjusted to pH 10 for magnetite The agitating is preferably carried out for the oxide to sufficiently form on the surface of the polymer particles, and as one example, agitating for 24 hours is preferable.

The pH may be adjusted by adding an alkaline material, and so sodium hydroxide or potassium hydroxide may be used, however, she alkaline material is not limited thereto.

The Step 4 is a step of obtaining a granular oxide adsorbent by washing and drying the polymer particles undergone the Step 3.

It is preferable that a drying process is carried out by placing the polymer particles for 48 hours at room temperature, then washing several times with ultrapure water, and a drying process is carried out once more in a vacuum oven for approximately 48 hours at room temperature.

With the method for preparing a granular metal oxide adsorbent, the granular oxide adsorbent may be prepared by adding polymer particles to an aqueous metal oxide solution and agitating them as described above.

In addition, the present invention provides a granular oxide adsorbent prepared using the preparation method described above. A granular oxide adsorbent according to the present invention may be used as pretreatment of membrane filtration, however, its use is not limited thereto. In addition, a granular oxide adsorbent according to the present invention may be effectively used in a water treatment system as described below.

Figure 1:
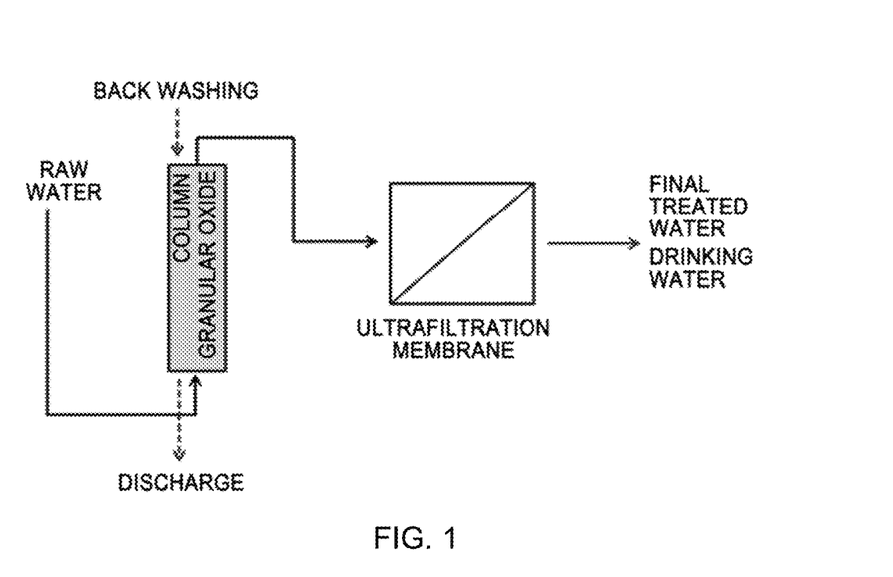
FIG. 1 is a block diagram of a hybrid system of granular iron oxide particles and an ultrafiltration membrane.

A hybrid ultrafiltration membrane process is carried out according to 4 types of operation plans. The first plan is not carrying out surface washing or backwashing while passing raw water directly through an ultrafiltration membrane. The second plan is almost the same as the first plan except that surface washing and backwashing are carried out. The third plan is passing raw water through a membrane after introducing iron oxide slurry thereto and adsorbing organic matters (FIG. 1).

Iron oxide adsorption and ultrafiltration membrane hybrid processes are carried out using a two-set operation of filtration and backwashing for efficient filtration cycle time and higher water recovery rate. In addition, each operation plan proceeds to the next step after operating 8 cycles of filtration times at intervals of 30, 15, 60, 90 and 120 minutes at a time.

According to one example of the present invention, it is demonstrated that the granular oxide adsorbent according to the present invention has an advantage of being efficiently used for a long period of time due to facile recovery and regeneration when comparing the organics removal efficiency a single adsorption process. Meanwhile, when examining the removal efficiency in adsorption and membrane filtration processes, approximately 20% of organic matters may be removed by the granular ferrihydrite adsorbent and the overall removal rate after passing through an ultrafiltration membrane is 22% in dissolved organic carbon. It is demonstrated that the granular magnetite adsorbent also removed approximately 20% of organic matters, which is almost identical, and finally, approximately 24% of an organic matter removal rate is obtained after passing through an ultrafiltration membrane.

Figure 5:
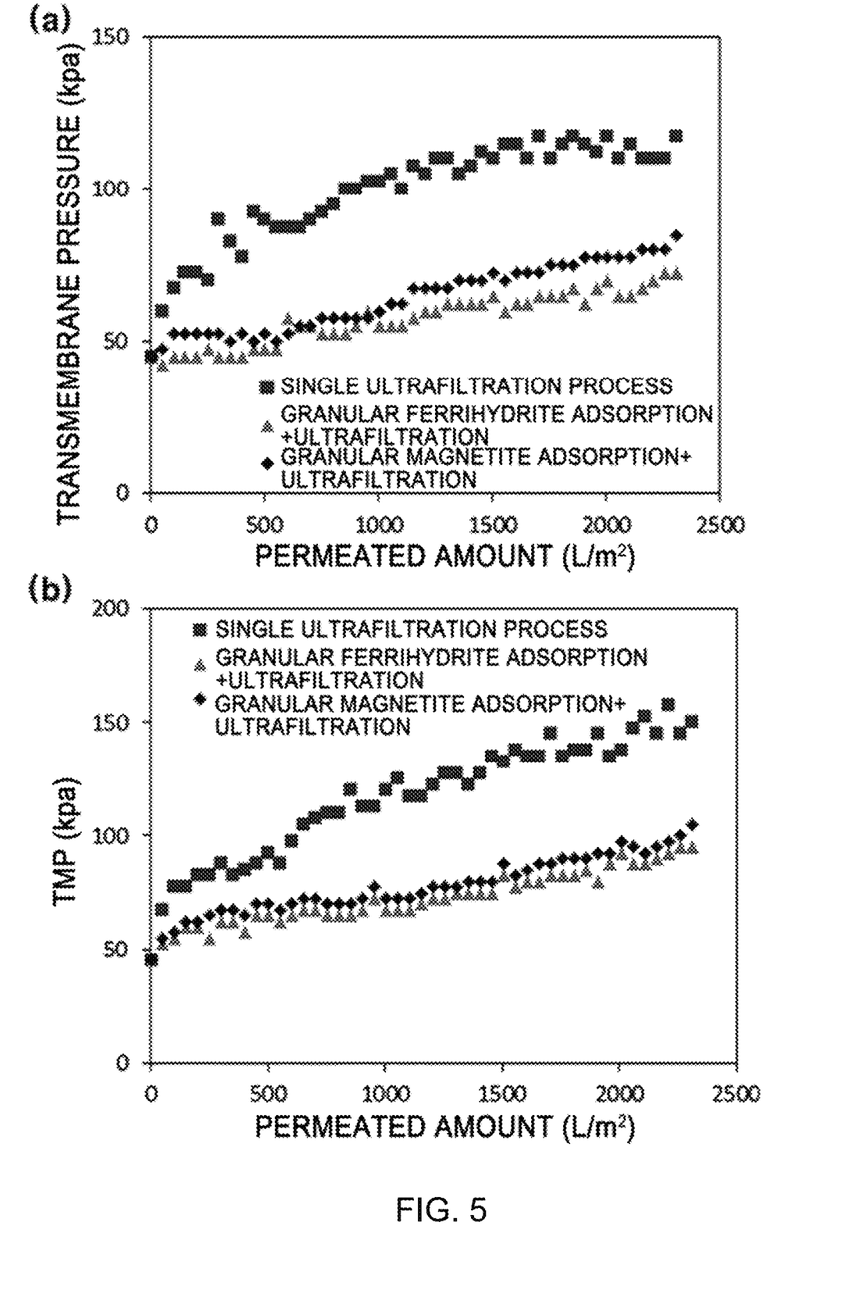
FIG. 5 shows graphs of transmembrane pressure changes for flow rates in various operating conditions through a PVDF membrane (a) and a PES membrane (b) according to one example of the present invention.

According to one experimental example of the present invention, when transmembrane pressure changes according to the cumulative volume of water treated are examined, the transmembrane pressure reaches up to 100 kPa when the water volume per membrane surface area reaches 1,000 l in a single ultrafiltration process, however, when the magnetite granular adsorbent is used, the transmembrane pressure reaches approximately 60 kPa from an initial 50 kPa when treating with 1,000 l/m$^2$, and when the granular ferrihydrite adsorbent is used, the transmembrane pressure reaches 45 kPa when treating with the same volume (1,000 l/m$^2$), and it is seen that the membrane fouling is markedly reduced (FIG. 5).

In addition, the present invention provides a water treatment method comprising a step of contacting the granular oxide adsorbent prepared above with influent water in the pretreatment of a water treatment process by a membrane filtration method (Step 1), and preferably further comprising a step of regeneration the granular oxide adsorbent (Step 2) after Step 1.

Step 1 is a step of water treatment by using the prepared granular oxide adsorbent as membrane filtration pretreatment and contacting the granular oxide adsorbent with waste water.

Step 2 is a step of removing adsorbed contaminants by treating with an alkaline solution of pH 10 to pH 13 or an oxidizing agent in order to regenerate the granular oxide adsorbent that underwent Step 1.

The alkaline solution of pH 10 to pH 13 is preferably one or more types selected from the group consisting of sodium hydroxide, potassium hydroxide, calcium hydroxide, sodium carbonate and potassium carbonate, but is not limited thereto.

In addition, the oxidizing agent is one or more types selected from the group consisting of hypochlorous acid, chlorine dioxide, hydrogen peroxide and ozone, but is not limited thereto.

In addition, Step 2 may preferably be periodically repeated before the adsorption capacity of the adsorbent is saturated. By repeating Step 2 periodically, the granular oxide adsorbent may be continuously reused.

The membrane filtration water treatment process of the present invention may continuously regenerate the granular oxide adsorbent by treating with an alkaline solution or an oxidizing agent as described above.

Accordingly, the method for preparing a granular oxide adsorbent may be used as an effective water treatment system.

Advantageous Effects

A granular oxide adsorbent in which a metal oxide is coated on polymer particles can control membrane fouling and enhance water treatment efficiency by being used as membrane filtration pretreatment of a water treatment system, and has an effect of providing an adsorbent for water treatment having high regeneration efficacy.

MODE FOR DISCLOSURE

Hereinafter, the present invention will be described in more detail with reference to examples. However, the following examples are for illustrative purposes only, and the scope of the present invention is not limited to these examples.

Example 1: Preparation of Polymer Particles

Polymer particles were prepared by placing polystyrene particles having a sulfonate group with an average diameter ranging from 0.6 mm to 0.7 mm in ultrapure water, placing them for 24 hours at room temperature after adjusting the pH to pH 2 with hydrochloric acid, washing several times with ultrapure water, and then completely drying in an oven.

Example 2: Preparation of Ferrihydrite Granular Oxide Adsorbent

An aqueous ferrihydrite solution was prepared by introducing $FeCl_3$ to distilled water and adjusting the final concentration to 10 g Fe/L, the polymer particles of Example 1 were immersed therein, and were agitated for approximately 12 hours. The pH was adjusted to pH 7 by adding an aqueous sodium hydroxide solution to the mixture. The mixture was agitated for approximately 48 hours so that the oxide was favorably formed in the polymer particles. The mixture was dried by being placed for 48 hours at room temperature. A ferrihydrite granular adsorbent was prepared by washing the dried mixture with ultrapure water several times for additional purification, and drying in a vacuum oven for approximately 48 hours at room temperature.

Example 3: Preparation of Magnetite Granular Oxide Adsorbent

An aqueous magnetite solution was prepared by introducing $FeSO_4$ to distilled water and adjusting the final concentration to 10 g Fe/L, the polymer particles of Example 1 were immersed therein, and were agitated for approximately 12 hours. The pH was adjusted to pH 11 by adding an aqueous sodium hydroxide solution to the mixture. The mixture was agitated for approximately 48 hours so that the oxide was favorably formed in the polymer particles. The mixture was dried by being placed for 48 hours at room temperature. A magnetite granular adsorbent was prepared by washing the dried mixture with ultrapure water several times for additional purification, and drying in a vacuum oven for approximately 48 hours at room temperature.

Experimental Example

1) Properties of Raw Water

For performance tests of the granular oxide adsorbents prepared in Example 2 and Example 3, influent raw water of Duryu Water Treatment Plant in Daegu, Korea, was used as feed water. The raw water was stored at 4° C. before use. The raw water was equilibrated for 2 hours at room temperature before the tests began. Then the raw water was treated with a 200 μm filter (Melt-Blown Bonded Cartridge Filter Pore-Cell Micro filter EP8P-LTC, Clean & Science, Korea) in order to remove turbidity and large particles, and used as the feed water. Specific qualities of the raw water are shown in Table 1.

TABLE 1

| Item | Value |
|---|---|
| pH | 7.23 |
| Turbidity, NTU | 0.297 |
| Total Organic Carbon, mg/L | 2.05 |
| $UV_{254}$, $cm^{-1}$ | 0.036 |
| SUVA, L/mg-m | 1.76 |
| Electrical Conductivity, μs/cm | 278 |
| Aluminum, mg/L | 0.056 |
| Calcium, mg/L | 27.06 |

2) Operating Condition of Membrane and Membrane Filtration System

An ultrafiltration membrane made of polyvinylidene fluoride (PVDF) having a pore size of approximately 40 nm was used after being made as a module having an effective membrane length of 25 cm and an effective membrane area of 13.35 $cm^2$. The ultrafiltration membrane was immersed in ultrapure water for 24 hours before the tests. In order to remove preservatives from the membrane surface in advance, all the membranes were washed by flowing an alkaline solution near pH 10 added with NaOH through the system.

A hybrid ultrafiltration membrane process was operated at a constant flow rate having a constant flux of 50 $l/m^2$-hr (corresponding to 1.11 ml/min as a flow rate). Specific pretreatment column and operating conditions are shown in Table 2.

TABLE 2

| Operating Condition | Value |
|---|---|
| Column Diameter, cm | 1.5 |
| Hydraulic Loading Rate, m/h | 0.556~0.600 |
| Flow Rate, mL/min | 1.112 |
| Bead Volume, mL | 16.68 |
| Empty Bed Contact Time, min | 15 |

All batch adsorption tests were carried out by placing a proper amount of each of iron oxide slurry and iron oxide coating beads (the granular adsorbent of the present invention) in a glass beaker at a constant temperature (23±2° C.), and under a constant concentration condition in 150 rpm and 100 ml raw water using a stirring rod. For the adsorption, isothermal adsorption tests and kinetic tests were carried out using time intervals of a constant cycle. In the iron oxide slurry adsorption tests, the concentration of organic matters dissolved in water after removing the adsorbent using a 0.45 μm filter (Milipore, USA) immediately after the adsorption. The empty bed contact time (EBCT) in the fixed adsorption column was set to 2 to 15 minutes, and the contact time was optimized by removing natural organic matter. Operating conditions of various iron oxide coating beads loaded in the column are shown in Table 3.

TABLE 3

| Operating Condition | Value |
|---|---|
| Effective Membrane Length, cm | 25 |
| Effective Membrane Area, cm² | 13.35 |
| Flux, L/m²hr | 50 |
| Supply Water Flow Rate, mL/min | 1.11 |
| Backwashing Flow Rate, mL/min | 84.8 |
| Backwashing Pressure, kPa | 100 |
| Temperature, ° C. | 23 ± 2 |
| Adsorption Bed Reactor Type | Up-flow |
| Column Size: diameter (cm) × length (cm) | 1.5 × 5.2 |

3) Analysis Method

An FE-SEM (Hitachi S-4300, Japan) was used to observe the changes in the bead surface and the membrane surface, and an EDS (EDX-350, Hitachi, Japan) was used to check the iron content in the elements that may be discovered in the bead surface. Total organic carbon was analyzed using a total organic carbon analyzer (Sievers 820, GE, USA) after removing particulates using a 0.45 μm, microfilter membrane (Millipore, USA). UV254 was measured at a wavelength of 254 nm in a quartz cell using a spectrophotometer (DR-4000, Hach, USA), and turbidity Was measured using a turbidimeter (2100P, Hach, Germany).

In addition, inorganic matters were analyzed through an inductively coupled plasma emission spectrometer (DV2100, Perkinelmer, USA) equipped with a MiraMist nebulizer (Perkinelmer, USA) after preparing a sample in accordance with an ICP pretreatment procedure of a standard method. For the molecular weight distribution analysis of dissolved materials in water was performed using a. GPC (CTS30, YOUNGLIN, KOREA), and other qualities of raw water were analyzed using a pH meter (pH 330i, wtw, Germany) and an electrical conductivity meter (cond 340i, wtw, Germany).

4) Evaluation on Iron Oxide Coated Granular Adsorbent Surface Properties

Figure 2:
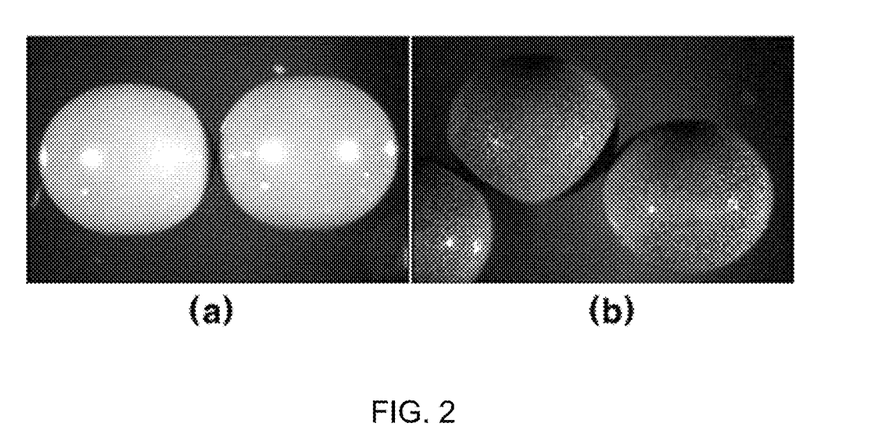
FIG. 2 shows the appearances of a ferrihydrite granular adsorbent and a magnetite granular adsorbent, which are iron oxide-coated granular adsorbents, according to one example of the present invention.

The surfaces of the granular oxide adsorbents obtained in Examples 2 and 3 were observed using a video microscope, and the results are shown in FIG. 2.

As shown in FIG. 2, the color was brown after being coated with ferrihydrite (FIG. 2(a)) and the color was black after being coated with magnetite (FIG. 2(b)), and it was identified that the bead surface was evenly well-coated.

5) Estimation of Proper Adsorbent Dose

Figure 3:
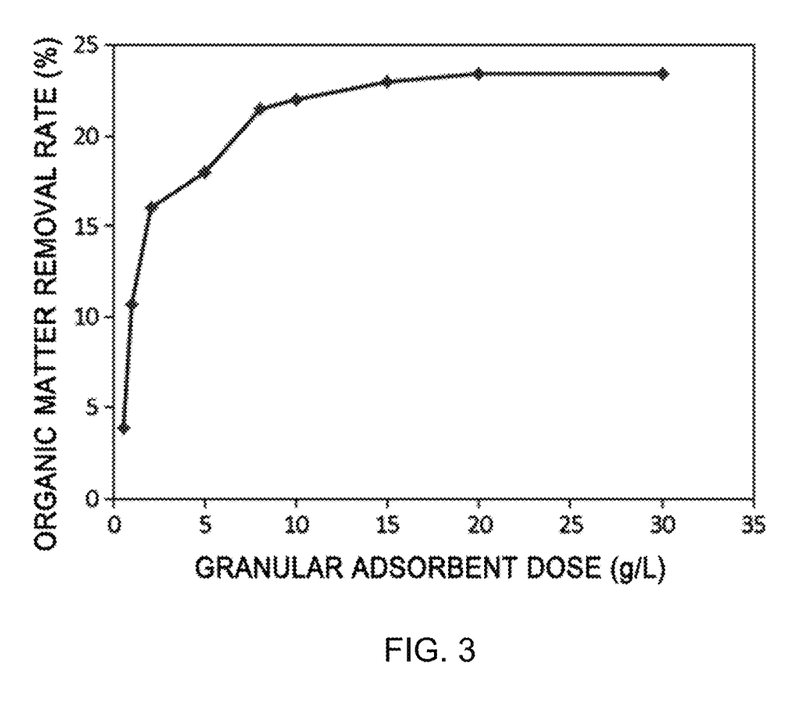
FIG. 3 shows a graph evaluating an organic matter removal rate by a granular ferrihydrite adsorbent according to one example of the present invention.

The kinetic test described above was carried out for natural organic matter in order to estimate proper adsorbent doses in a continuous membrane process (FIG. 3).

When examining the organic matter removal rate according to the ferrihydrite granular adsorbent dose as shown in FIG. 3, the removal rate reached approximately 22% when the dose became approximately 10 g/l, and even when the dose was further increased, the organic matter removal rate maintained 23%.

Based on the kinetic test result, the adsorption rate coefficient (k) value and the adsorption capacity ($q_e$) value of dissolved organic carbon by powdery and granular ferrihydrite adsorbents were measured applying a pseudo-second order model for each operating condition, and the result showed that the adsorption capacity was similar, however, the adsorption rate was 3 times higher for the granular type. The specific results of pseudo-second order dynamic model application for natural organic matter adsorption by powdery and granular ferrihydrite adsorbents are as shown in Table 4, and the measurements were carried out under the conditions of powdery ferrihydrite of 400 mg/l as Fe, granular ferrihydrite of 8 g beads/l (416 mg/l as Fe), and natural organic matter initial, concentration of 2.05 mg/l.

TABLE 4

| Adsorbent | K (g/mg-min) | $q_e$ (mg/g) | R² |
|---|---|---|---|
| Powdery Iron Oxide | 0.144 | 1.423 | 0.955 |
| Granular Iron Oxide | 0.407 | 1.130 | 0.988 |

Figure 4:
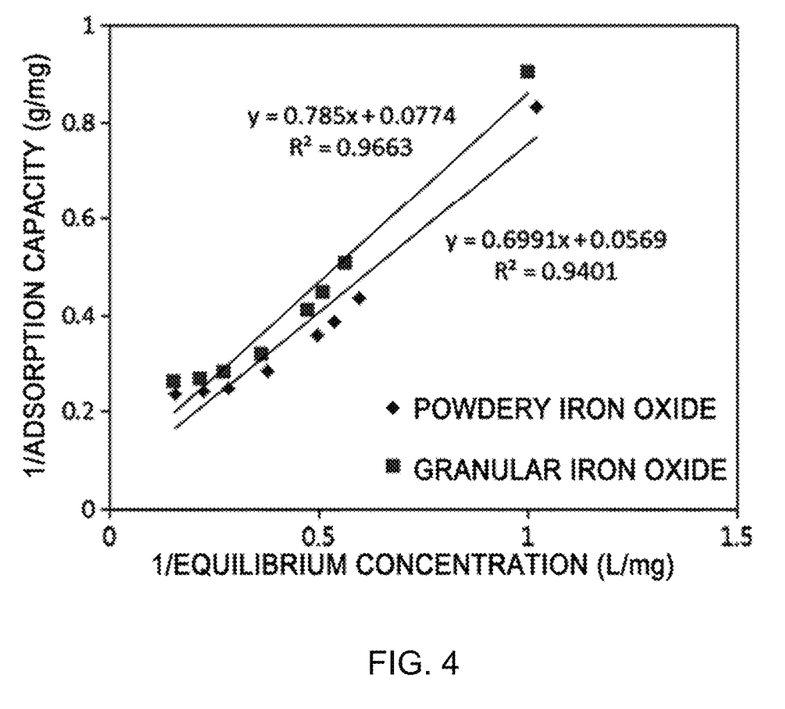
FIG. 4 shows an isothermal adsorption graph of powdery and granular ferrihydrite adsorbents according to one example of the present invention.

In addition, the isothermal adsorption test result demonstrated that the granular iron oxide adsorption mechanism included monolayer adsorption (FIG. 4).

6) Organic Matter Removal Evaluation and Membrane Permeability Changes in Adsorption and Membrane Filtration Processes Based on the test results described above, organic matter removal and membrane permeability changes were observed using a hybrid process of an adsorbent (e.g., powdery ferrihydrite, granular ferrihydrite, granular magnetite) and a membrane, in addition to a single membrane process. When the organic matter removal efficiency by a single adsorption process was compared, all adsorbent types showed similar removal rates of 20 to 24%.

In addition, FIG. 5 shows transmembrane pressure changes for cumulative water volume treated under each operating condition. In FIG. 5, is a case in which a PVDF membrane is used, and (b) is a case in which a PES membrane is used. As shown in FIG. 5, it was demonstrated that the transmembrane pressure reached up to 100 kPa when the water volume per membrane surface area reaches approximately 1,000 l in a single ultrafiltration process. Meanwhile, when the magnetite granular adsorbent was used, the transmembrane pressure reached approximately 60 kPa from initial 50 kPa when treating with 1,000 l/m², and when the granular ferrihydrite adsorbent was used, the transmembrane pressure reached 45 kPa when treating with the same volume (1,000 l/m²), and it was seen that the membrane fouling was markedly improved.

7) Analysis of Organic Matter Molecular Weight Distribution Changes Before and After Adsorption Organic matter molecular weight distribution changes were measured for the samples before and after adsorption in order no understand the cause of marked reduction in membrane fouling when pretreatment removing 20% of dissolved organic carbon by adsorption is carried out.

As a result, 3 main peaks were identified, and the first among them appeared at a molecular weight of 1000 kDa, the second peak at 220 kDa, and the third peak at 26 to 64 kDa. The first peak had a $UV_{260}$ value of approximately 0.43 cm⁻¹ as a macro organic molecule included in raw water, however, the $UV_{260}$ value greatly decreased to 0.1 cm⁻¹ or less after the adsorption treatment. In addition, the initial $UV_{260}$ value of the second peak was approximately 0.45 $cm^{-1}$, and the initial $UV_{260}$ value of the third peak was 0.4 $cm^{-1}$.

8) Evaluation on Regeneration Efficiency of Adsorbent

Figure 6:
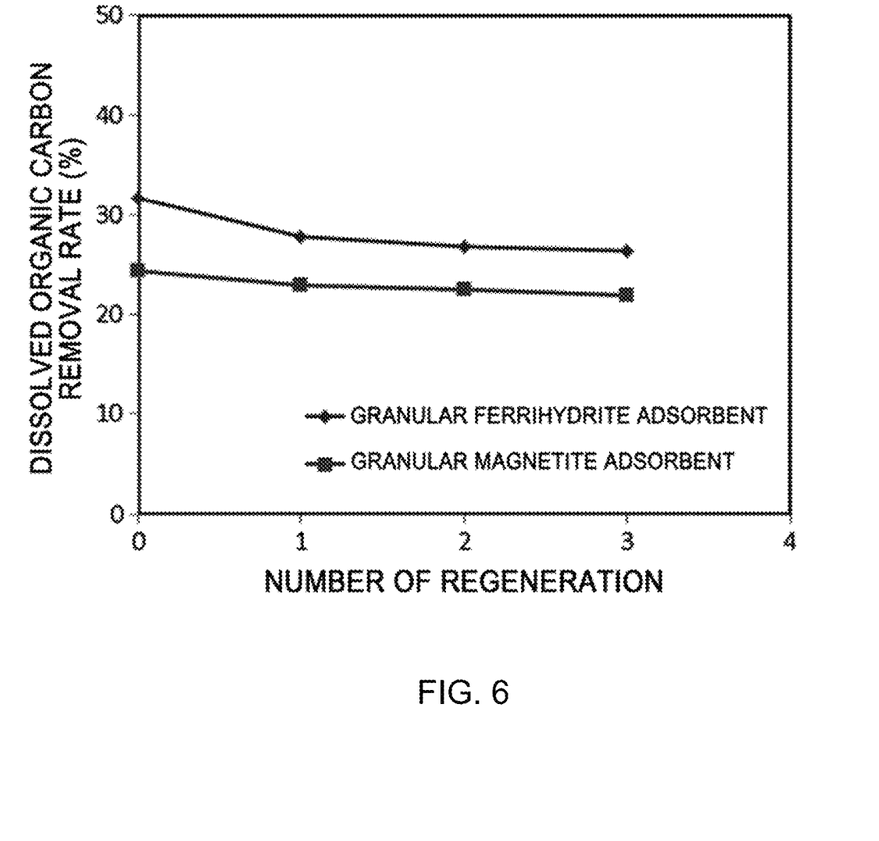
FIG. 6 shows a graph showing adsorption capability changes according to the regeneration of a granular oxide adsorbent according to one example of the present invention.

FIG. 6 compares the regeneration efficiency of granular ferrihydrite and magnetite adsorbents. Through FIG. 6, it was demonstrated that the removal rate is similar to the initial dissolved organic carbon removal rate after regeneration regardless of the granular oxide types, and it was seen that the dissolved organic carbon removal rate generally appeared somewhat high when the granular ferrihydrite adsorbent was introduced.

The invention claimed is:

1. A method for preparing a granular oxide adsorbent, having metal oxide on an acid-treated surface of a polymer particle, comprising the steps of:
   placing polymer particles in an acidic solution, thereby treating a surface of the polymer particle so that a metal oxide can be bound to the surface of the polymer particle;
   washing the surface-treated polymer particles;
   adding the surface-treated polymer particles to an aqueous metal oxide solution, adjusting the pH of the aqueous metal oxide solution to a range of from pH 5 to pH 10 while agitating the solution, thereby forming the metal oxide on the acid-treated surface of the polymer particle; and
   washing and drying the polymer particles, having metal oxide on the acid-treated surface thereof;
   wherein the metal oxide is one or more types selected from the group consisting of iron oxide, aluminum oxide, and titanium oxide.

2. The method for preparing a granular oxide adsorbent of claim 1, wherein a polymer of the polymer particles to be treated with an acid in the acidic solution has a sulfonate group.

3. The method for preparing a granular oxide adsorbent of claim 2, wherein the polymer of the polymer particles is sulfonated polystyrene.

4. The method for preparing a granular oxide adsorbent of claim 1, wherein the acidic solution is one or more types selected from the group consisting of hydrochloric acid, nitric acid and sulfuric acid.

5. The method for preparing a granular oxide adsorbent of claim 4, wherein a pH of the acidic solution ranges from pH 1 to pH 3.

6. The method for preparing a granular oxide adsorbent of claim 1, wherein the metal oxide is one or more types selected from the group consisting of ferrihydrite, magnetite, hematite and goethite.

* * * * *